United States Patent [19]
Veintimilla

[11] Patent Number: 5,943,375
[45] Date of Patent: *Aug. 24, 1999

[54] METHOD TO INDICATE SYNCHRONIZATION LOCK OF A REMOTE STATION WITH A BASE STATION

[75] Inventor: Gregory J. Veintimilla, Redmond, Wash.

[73] Assignee: AT&T Wireless Services Inc., Kirkland, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/796,492

[22] Filed: Feb. 6, 1997

[51] Int. Cl.$^6$ ............................... H04L 7/00; H04L 7/06; H04J 3/06

[52] U.S. Cl. ........................ 375/355; 375/364; 370/503

[58] Field of Search ................................. 375/364, 362, 375/207, 356, 354, 355, 209, 206, 208, 202, 201; 370/513, 503, 342, 343, 330, 350, 344, 480

[56] References Cited

U.S. PATENT DOCUMENTS

| | | | |
|---|---|---|---|
| 4,599,732 | 7/1986 | LeFever | 375/346 |
| 5,282,228 | 1/1994 | Scott et al. | 375/344 |
| 5,428,647 | 6/1995 | Rasky et al. | 375/366 |
| 5,490,174 | 2/1996 | Shin et al. | 375/355 |
| 5,537,419 | 7/1996 | Parr et al. | 375/231 |
| 5,627,855 | 5/1997 | Davidovici | 375/207 |
| 5,659,573 | 8/1997 | Bruckert et al. | 375/355 |

FOREIGN PATENT DOCUMENTS

| | | |
|---|---|---|
| 0 630 120 | 12/1994 | European Pat. Off. . |
| 0 675 606 | 10/1995 | European Pat. Off. . |
| 0 704 985 | 4/1996 | European Pat. Off. . |
| 0 749 213 | 12/1996 | European Pat. Off. . |
| WO 97/02675 | 1/1997 | WIPO . |

*Primary Examiner*—Stephen Chin
*Assistant Examiner*—Albert Park

[57] ABSTRACT

A method for a wireless discrete tone communications system, synchronizes the remote station to the base station. The method begins with the step of generating a clock signal at the base station. The base station then derives a synchronization symbol pattern from the base station clock signal and spreads the it with spreading codes that distributes the symbol pattern over a plurality of discrete tones, forming a discrete tone signal. The base station then transmits the spread signal to the remote station. The remote station generates a first clock signal and samples the discrete tones using the remote station first clock signal, forming a first sampled signal. Then the remote station applies the first sampled signal to a matched filter bank, forming a frequency error signal. The method then adjusts a frequency of the remote station first clock signal using the frequency error signal, forming a second clock signal. Then the remote station samples the discrete tones using the remote station second clock signal, forming a second sampled signal. Then the remote station despreads the second sampled signal with despreading codes to extract the synchronization symbol pattern. Then the remote station compares the extracted synchronization symbol pattern with a reference symbol pattern at the remote station. If the comparing step is successful, then the remote station selectively processes traffic signals received from the base station using the second clock signal. If the comparing step is not successful, then the remote station selectively adjusts a time offset value of the remote station second clock signal forming a third clock signal. The remote station then samples the discrete tones using the remote station third clock signal, forming a third sampled signal. The remote station then despreads the third sampled signal with despreading codes to form a second extraction of the synchronization symbol pattern. The remote station then compares the second extraction of the synchronization symbol pattern with the reference symbol pattern at the remote station. If the step of comparing the second extraction is successful, then the remote station selectively processes traffic signals received from the base station using the third clock signal.

12 Claims, 7 Drawing Sheets

METHOD TO INDICATE SYNCHRONIZATION LOCK OF A REMOTE STATION WITH A BASE STATION

CROSS REFERENCES TO RELATED APPLICATIONS

The invention disclosed herein is related to the copending U.S. patent application by Alamouti, et al., entitled "METHOD FOR FREQUENCY DIVISION DUPLEX COMMUNICATIONS," Ser. No. 08/796,584, filed the same day as the instant patent application, assigned to AT&T Wireless Services, Inc., and incorporated herein by reference.

FIELD OF THE INVENTION

This invention involves improvements to communications systems and methods in a wireless discrete tone communications system.

DESCRIPTION OF RELATED ART

Wireless communications systems, such as cellular and personal communications systems, operate over limited spectral bandwidths and must make highly efficient use of the scarce bandwidth resource for providing good service to a large population of users. Wireless systems consist of cells, each of which include a base station and remote units. The Personal Wireless Access Network described in the Alamouti, et al patent application cited above, is an example of a successful technology for wireless service.

The personal wireless access network (PWAN) system described in the referenced Alamouti, et al. patent application, uses a form of the protocol known as discrete tone to provide efficient communications between a station and a plurality of remote stations. In this protocol, the user's data signal is modulated by a set of weighted discrete frequencies or tones. The weights are spatial spreading codes that distribute the data signal over many discrete tones covering a broad range of frequencies. The weights are complex numbers with the real component acting to modulate the amplitude of a tone while the complex component of the weight acts to modulate the phase of the same tone. Each tone in the weighted tone set bears different data signals. The station where it is processed with despreading codes to recover the user's data signal. For each of the spatially separated antennas at the receiver, the received discrete tone signals are transformed from time domain signals to frequency domain signals. Despreading weights are assigned to each frequency component of the signals received by each antenna element. The values of the despreading weights are combined with the received signals to obtain an optimized approximation of individual transmitted signals characterized by a particular discrete tone set and transmitting location. The PWAN system has a total of 2560 discrete tones (carriers) equally spaced in 8 MHz of available bandwidth in the range of 1850 to 1990 MHz. The spacing between the tones is 3.125 KHz. The total set of tones are numbered consecutively form 0 to 2559 starting from the lowest frequency tone. The tones are used to carry traffic messages and overhead messages between the base station and the plurality of remote stations. The traffic tones are divided into 32 traffic partitions, with each traffic channel requiring at least one traffic partition of 72 tones.

In addition, the PWAN system uses overhead tones to establish synchronization and to pass control information between the base station and the remote stations. A Common Link Channel (CLC) is used by the base to transmit control information to the Remote stations. A Common Access Channel (CAC) is used to transmit messages from the Remote station to the Base. There is one grouping of tones assigned to each channel. These overhead channels are used in common by all of the remote stations when they are exchanging control messages with the base station.

In the PWAN system, Frequency Division Duplexing (FDD) is used by the base station and the remote station to transmit data and control information in both directions. Transmission from the base station to the remote station is called forward transmission and transmission from the remote station to the base station is called reverse transmission. The base station and each remote station must synchronize and conform to the timing structure and both the base station and the remote station must synchronize to a framing structure. All remote stations and base stations must be synchronized so that all remote stations transmit at the same time and then all base stations transmit at the same time. When a remote station initially powers up, it acquires synchronization from the base station so that it can exchange control and traffic messages within the prescribed time format. The remote station must also acquire frequency and time synchronization for the signals so that the remote is operating at the same frequency and time as the base station. The PWAN wireless communications system, and other limited bandwidth communications systems, need to exploit new techniques to make the most efficient use of the scarce bandwidth resource to provide good service to a large population of users.

SUMMARY OF THE INVENTION

A method is disclosed for a wireless discrete tone communications system, for synchronizing the remote station to the base station. In accordance with the invention, the method begins with the step of generating a clock signal at the base station. The base station then derives a synchronization symbol pattern from the base station clock signal. The base station spreads the synchronization symbol pattern with spreading codes that distributes the synchronization symbol pattern over a plurality of discrete tones, forming a spread signal. The base station then transmits the spread signal to the remote station.

The remote station generates a first clock signal. In accordance with the invention, it then samples the discrete tones using the remote station first clock signal, forming a first sampled signal. Then the remote station applies the first sampled signal to a matched filter bank, forming a frequency error signal. The method then adjusts a frequency of the remote station first clock signal using the frequency error signal, forming a second clock signal. Then the remote station samples the discrete tones using the remote station second clock signal, forming a second sampled signal. Then the remote station despreads the second sampled signal with despreading codes to extract the synchronization symbol pattern. Then the remote station compares the extracted synchronization symbol pattern with a reference symbol pattern at the remote station. If the comparing step is successful, then the remote station selectively processes traffic signals received from the base station using the second clock signal.

Further, in accordance with the invention, the remote station selectively adjusts a time offset value of the remote station second clock signal forming a third clock signal, if the comparing step is not successful. The remote station then samples the discrete tones using the remote station third clock signal, forming a third sampled signal. The remote station then despreads the third sampled signal with despreading codes to form a second extraction of the synchronization symbol pattern. The remote station then compares the second extraction of the synchronization symbol pattern with the reference symbol pattern at the remote station. If the step of comparing the second extraction is successful, then the remote station selectively processes traffic signals received from the base station using the third clock signal.

Currently, the invention has advantageous applications in the field of wireless communications, such as cellular communications or personal communications, where bandwidth is scarce compared to the number of the users and their needs. Such applications may be effected in mobile, fixed, or minimally mobile systems. However, the invention may be advantageously applied to other, non-wireless, communications systems as well.

BRIEF DESCRIPTION OF THE DRAWINGS

These and other objects, features and advantages will be more fully appreciated with reference to the accompanying drawing and detailed description.

DESCRIPTION OF THE PREFERRED EMBODIMENT

Figure 1:
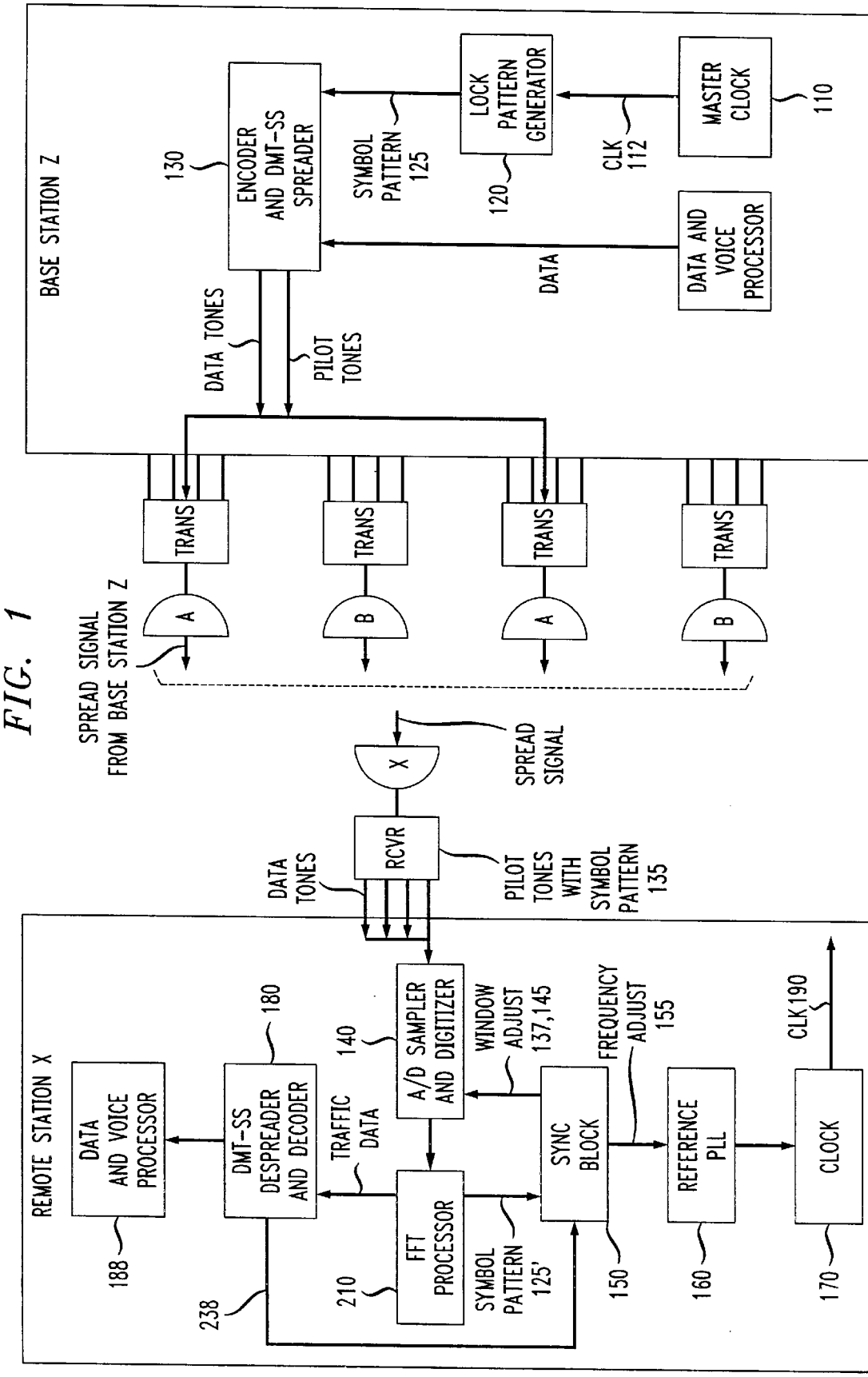
FIG. 1 is an overall architectural view of the PWAN communication system showing the base station Z and the remote station X.

FIG. 1 shows an overall functional block diagram of PWAN system, in accordance with the invention. The PWAN system is a wireless discrete tone communication system. The invention synchronizes the remote station (also referred to as the remote unit) X to the base station Z for both the frequency and the timing characteristics of a clock signal 112 generated by a master clock 110 at the base station Z. In accordance with the invention, the base station Z develops a master clock signal 112 by a means of the master clock 110 which is a highly accurate clock signal source. In a preferred embodiment of the invention, the master clock is generated based on a clock signal received from a global positioning system satellite transmission. The lock pattern generator 120 at the base station Z uses the clock signal 112 to generate a unique symbol pattern 125 which will be used as a synchronization symbol pattern. A barker code or other suitable patterns can be used that have a low correlation for side lobe interference and a distinctive sequence to facilitate recognition. A barker code is a fixed predetermined eight-bit pattern which provides a position reference in a frame for aligning the clock of the remote station with the clock of the transmitter in the base station. An example of a barker code is given in U.S. Pat. No. 5,323,447 by Gillis, et al. entitled "APPARATUS AND METHOD FOR MODIFYING A FREQUENCY HOPPING SEQUENCE OF A CORDLESS TELEPHONE OPERATING IN A FREQUENCY HOPPING SYSTEM", assigned to AT&T Bell Laboratories, and incorporated herein by reference. Symbol pattern 125 is modulated by binary phase shift keying (BPSK), quadrature amplitude modulation (QAM), or other suitable modulation technique and the thus encoded symbol pattern is spread in the discrete tone ( ) spreader 130. Data signals and voice signals from the data and voice processor are also encoded by QAM or BPSK modulation in the same manner and spread by the spreader 130. The symbol pattern 125 is encoded and spread into pilot tones of which there are at least two produced by the base station Z. The data and voice signals are encoded and spread into data traffic tones which occur in at least pairs which are produced by the base station Z. The combination of data tones and pilot tones are then processed by the transmitters and transmitted by the antennas A,B,C, and D, of the base station Z as a spatially spread signal which is sent to the remote station X. The base station spreads the synchronization symbol pattern with spreading codes that distributes the synchronization symbol pattern over a plurality of discrete pilot tones forming the spread signal which is received by antenna X at the remote station X.

The personal wireless access network (PWAN) system is described in the referenced Alamouti, et al. patent application. The base transmits information to multiple remote stations in its cell.

Figure 2:
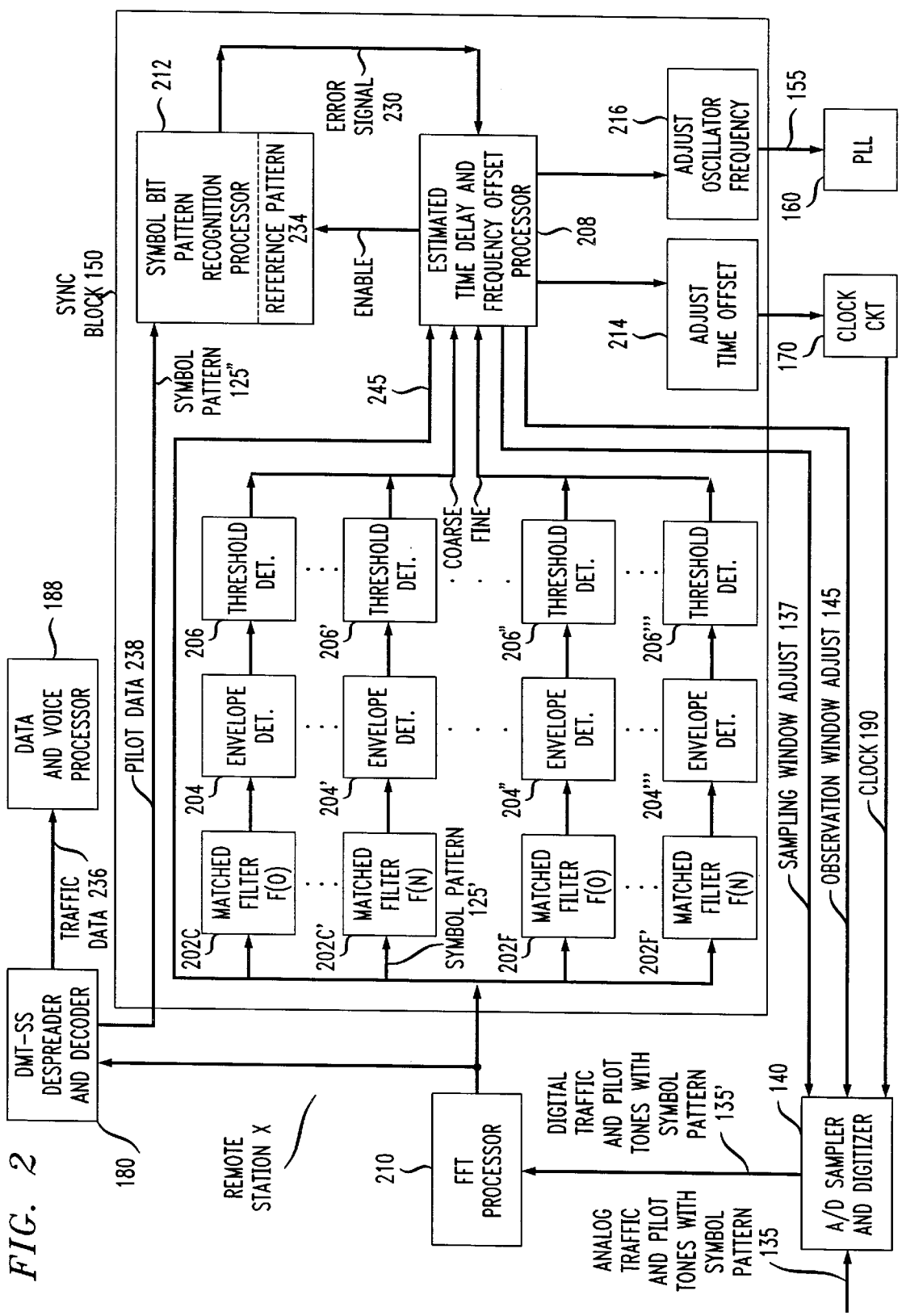
FIG. 2 is a more detailed functional block diagram of the remote station X, featuring the sync block 150.

FIG. 1 shows the remote station X with the traffic tones and pilot tones, with the symbol pattern 135 applied to the A/D sampler and digitizer 140. The traffic and pilot tones with the symbol pattern 135 are input to the analog to digital sampler and digitizer 140 which is shown in greater detail in FIG. 3. The digitized traffic and pilot tones are then output as a digitized pattern 135' to the fast Fourier transform processor 210. As is shown in FIG. 2, the FFT processor 210 takes the sampled and digitized symbol pattern 135' and transforms it from the time domain to the frequency domain thereby producing symbol pattern 125' which is applied to the synchronization (sync) block 150 shown in greater detail in FIG. 2. The frequency domain transform signal is also applied from the FFT processor 210 to the despreader and decoder 180 shown in FIG. 2. Traffic data 236 is output from the despreader and decoder 180 to the data and voice processor 188 in the remote station X. Pilot and data 238 is output from the despreader and decoder 180 and is input into the sync block 150. The sync block 150 provides window adjustment signals 137 and 145 which are fed back to the analog to digital sampler and digitizer 140. The sync block 150 provides a frequency adjustment output 155 to the reference phase lock loop (PLL) 160 which in turn, drives the clock circuit 170 to produce the remote station clock signal CLK 190. The CLK 190 clock signal is also fed back to the analog to digital sampler and digitizer 140.

Figure 3:
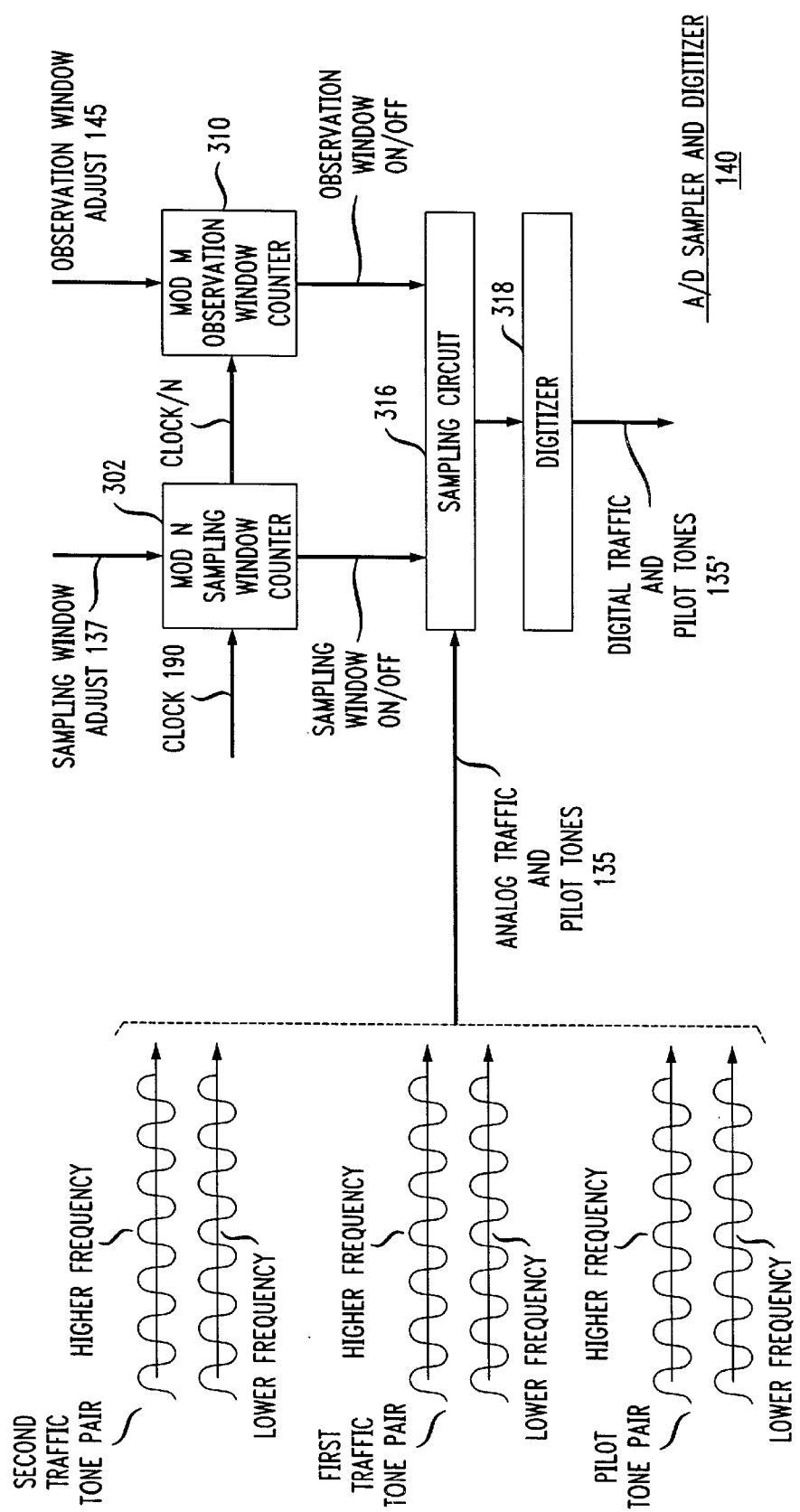
FIG. 3 is a more detailed functional block diagram of the A/D sampler and digitizer 140 in the remote station X.

FIG. 3 shows greater detail of the analog to digital sampler and digitizer 140, as it samples a pilot tone pair consisting of a higher frequency and a lower frequency, a first traffic tone pair consisting of a higher frequency and a lower frequency, and a second traffic tone pair consisting of a higher frequency and a lower frequency. The remote station clock CLK 190 is applied to a modulo N sampling window counter 302. The output of the Modulo N sampling window counter 302 is the clock signal 190 divided by the integer N which is a reduced rate clock signal applied to the Modulo M observation window counter 310. The Modulo N sampling window counter 302 provides a sampling window on/off signal to the sampling circuit 316. The Modulo M observation window counter 310 applies an observation window on/off signal to the sampling circuit 316. The analog traffic and pilot tones 135 are applied to the sampling circuit 316, in a manner which will be understood with reference to FIGS. 5A and 5B.

Figure 4A:
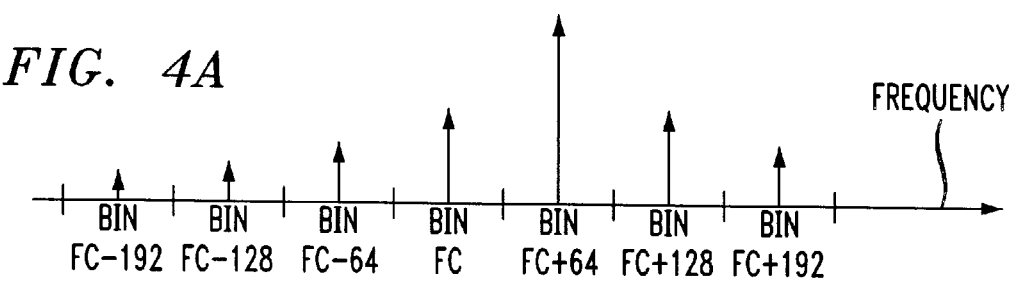
FIG. 4A is a diagram in the frequency domain of the fast Fourier transform (FFT) frequency bins for a first, coarse measurement.
Figure 4B:
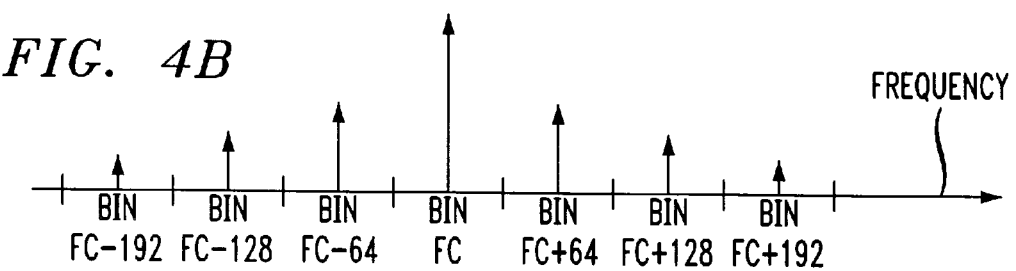
FIG. 4B illustrates the coarse frequency bins of FIG. 4A, in a second stage of the measurement, where the oscillator frequency is adjusted to move the FFT bin with the largest energy to the center frequency, FC.
Figure 4C:
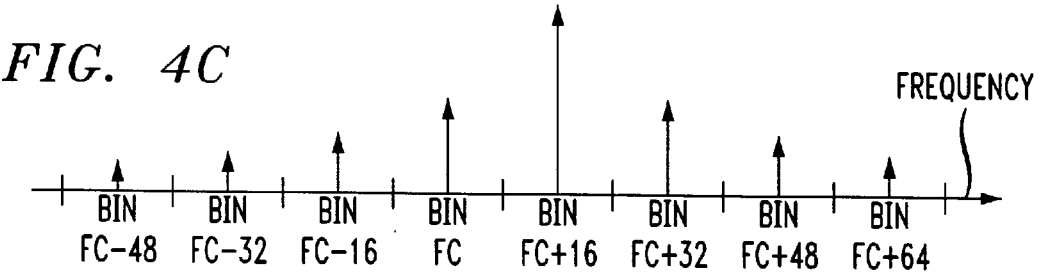
FIG. 4C illustrates the fine frequency bins for a first, fine measurement.
Figure 4D:
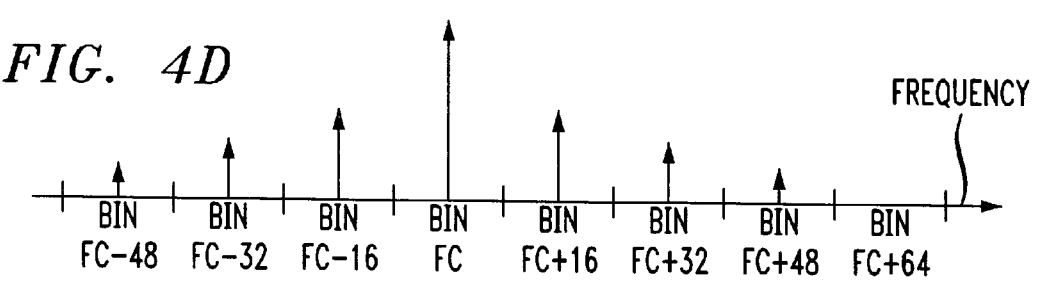
FIG. 4D illustrates the fine frequency bins for a second stage of the fine frequency measurement, where the oscillator frequency is adjusted to move the FFT bin with the largest energy to the center frequency, FC.
Figure 5A:
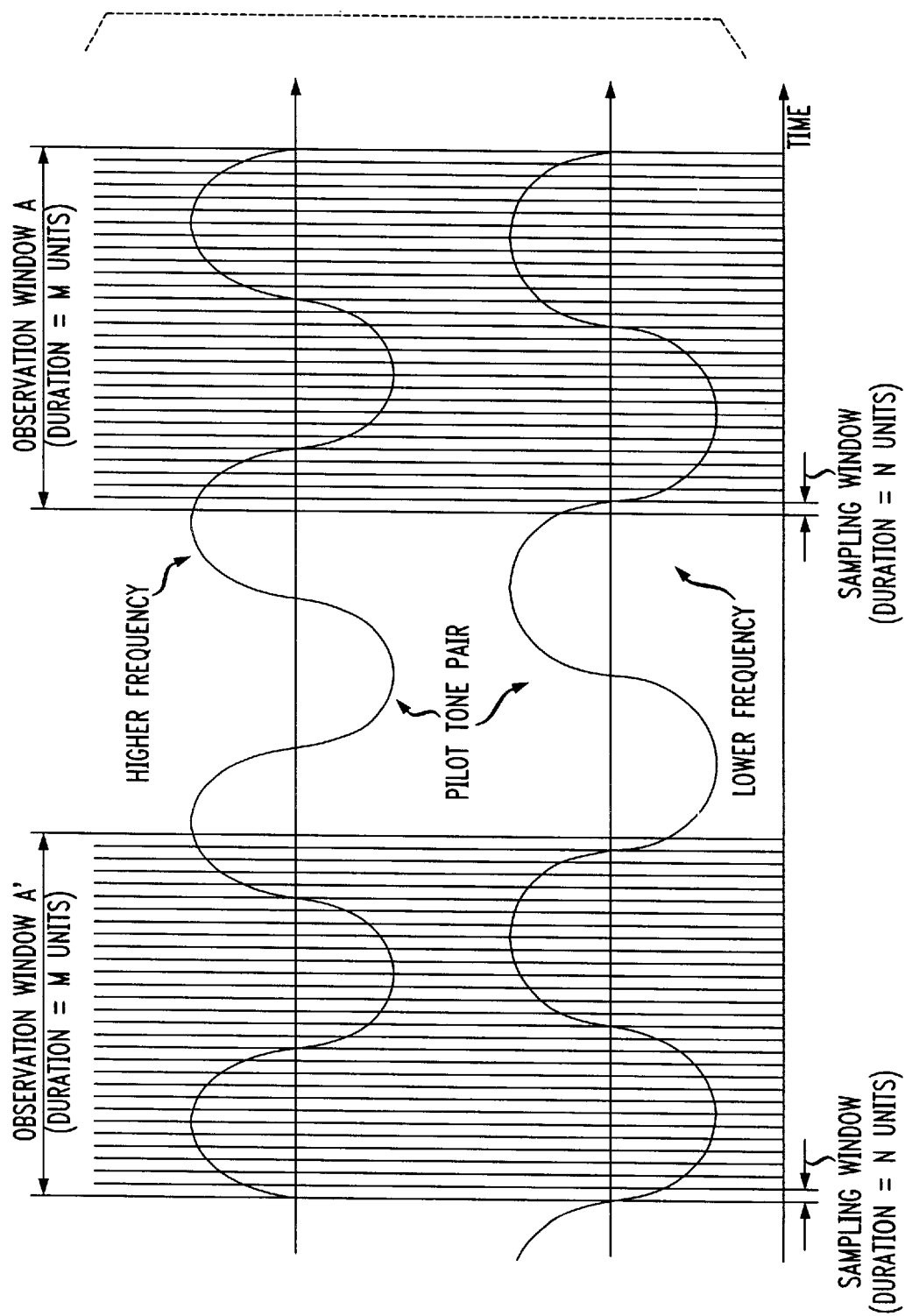
FIG. 5A illustrates the observation window and the sampling window for measuring the requency characteristics of the pilot tones.
Figure 5B:
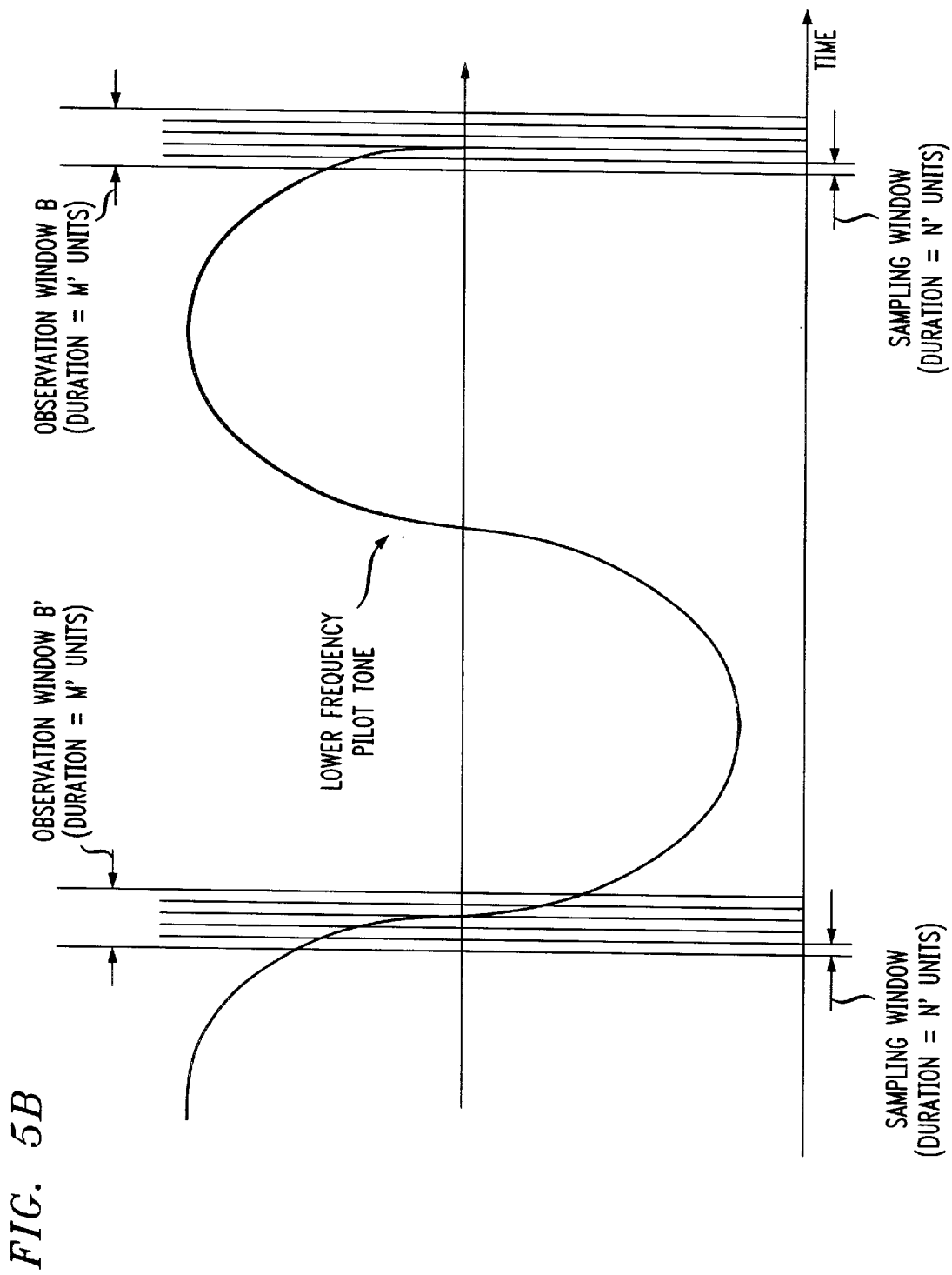
FIG. 5B illustrates the observation window and the sampling window for measuring the time characteristics of a pilot tone.

FIG. 5A, the observation window A has a duration of M units of the clock signal 190. The observation window A includes a plurality of smaller sampling windows each of which has a duration of N units of the clock signal CLK 190N. Observation windows are periodically applied to the sampling circuit 316 as is seen in FIG. 5A where observation window A and observation window A' are applied to the pilot tone pair. The sampling window adjust signal 137 which is output from the sync block 150, controls the value of the quantity "N" for the Modulo N sampling window counter 302. The observation window adjust signal 145 from the sync block 150, controls the value of the quantity "M" for the Modulo M observation window counter 310. By use of the adjustment signals 137 and 145, the size or duration and the location in time of the observation windows A and A' and the sampling windows in FIG. 5A can be controlled by the sync block 150. For example, a first setting of the signals 137 and 145 will provide the observation window A and observation window A' with a duration M and their sampling windows with a duration N, which are positioned in time as shown in FIG. 5A, for gathering samples of a pilot tone to characterize it's frequency. This will be shown in the frequency domain diagrams of FIGS. 4A, 4B, 4C, and 4D. Alternately, the values for the adjustment signals 137 and 145 can control the duration and location of the observation windows and sampling windows as shown in FIG. 5B. Observation windows B and B' and the sampling windows of FIG. 5B have different durations, M' and N', respectively, and different positions in time, which are suitable for the characterization of the time (or phase) characteristics of a pilot tone. Techniques for the detection of signals having an unknown time (or phase) shift and an unknown frequency shift are described for example by R. N. McDonough, et al. "Detection of Signals in Noise", second edition, Academic Press, 1995.

The output of the sampling circuit 316 in FIG. 3 is the sampled values of input pilot one waveform, which is then digitized in the digitizer 318 to produce digital traffic and pilot ones 135'. The digitization can be pulse code modulation (PCM) or other forms of digitization of the sampled waveform for the traffic and pilot tones input to the sampling circuit 316.

The FFT processor 210 in FIG. 2 receives the digital traffic and pilot tones with symbol pattern 135' and performs a fast Fourier transform of the wave forms producing a frequency domain characterization as is shown in FIGS. 4A, 4B, 4C, and 4D. The frequency domain characterization of a pilot tone, for example, the lower frequency pilot tone of FIG. 5A, is applied to matched filter banks shown in FIG. 2. Two matched filter banks are shown in FIG. 2, one is characterized as a coarse bank, with a set of matched filters separated by a larger frequency span of 64 Hz., for example. The second is characterized as a fine bank, with a set of matched filters separated by a smaller frequency span of 16 Hz., for example. The coarse matched filter bank consists of a plurality of matched filters, of which only two are shown, F(0) 202C and F(n) 202C'. Each filter is followed by an envelope detector 204 or 204' and a threshold detector 206 or 206', respectively. In the PWAN system, the fast Fourier transform can be viewed as a bank of matched filters. In particular, since there are 320 tones that carry traffic information and pilot tones, there will be 320 different 3 KHz filters. Each bank of matched filters can be separated by a small frequency range . The coarse matched filter bank 202C–202C' can be separated by 64 Hz, as is shown in FIGS. 4A and 4B. The fine matched filter bank consisting of matched filters 202F–202F' can be separated by smaller frequency range, such as 16 Hz as is shown in 4C and 4D. The fine matched filter bank has the matched filter F(0) 202F followed by envelope detector 204" and threshold detector 206". The matched filter F(N) 202F' is followed by the envelope detector 204''' and the threshold detector 206'''. Each matched filter implements a time domain autocorrelation function in the frequency domain. The objective of a matched filter bank is to identify the particular frequency bin that has the maximum energy content for the fast Fourier transform of the input pilot tone signal. The expected frequency of the pilot tone is a center frequency FC. If the maximum energy produced by a filter bank corresponds to a matched filter which is at a different frequency than the bin centered on the center frequency FC, then the oscillator frequency for the phase locked loop 160 in the remote station must be adjusted so as to move the apparent FFT bin with the largest energy to the center frequency FC. This is shown in the transition from FIG. 4A to FIG. 4B for the coarse filter bank.

The estimated time delay and frequency offset processor 208 in FIG. 2 identifies the FFT bin having the greatest energy. If the bin having the greatest energy is not the center frequency bin FC, then a correction signal is applied by processor 208. This causes the adjust oscillator frequency module 216 in FIG. 2 to apply a frequency adjustment signal to the oscillator in the phase locked loop 160 which is sufficient to shift the apparent bin having maximum energy to the center frequency FC, as is shown in FIG. 4B. This results in a new, second clock signal CLK 190.

Then, in accordance with the invention, the estimated time delay and frequency offset processor 208 applies an enabling signal to the symbol bit pattern recognition processor 212 in FIG. 2. A second sample of the pilot tone is taken, using the new, second CLK 190 clock signal. The pilot data 238 output from the spreader and decoder 180 includes the symbol pattern 125" which is applied to an input of the pattern recognition processor 212. If the frequency and the time offset of the second clock signal CLK 190 is synchronized with that of the pilot tone, then the symbol pattern 125" will be the same as the symbol pattern 125 transmitted from the base station. A replica of the symbol pattern 125 transmitted from the base station is stored as the reference pattern 234 in the symbol bit pattern recognition processor 212. The pattern recognition processor 212 stores the reference pattern 234 which it will compare with the symbol 125". If there is a successful match, this indicates that both that both the frequency and the phase of the new, second clock signal CLK 190 are synchronized with that of the pilot tone sampled by the sampling circuit 316. This is a synchronization lock indication.

If there is no match, the error signal 230 is output by the recognition processor 212 to the estimated time delay and frequency offset processor 208. The processor 208 then identifies the matched filter in the fine matched filter bank that has the maximum energy for the second sampled tone in the modified observation windows A and A' of FIG. 5A. The absolute position of the observation windows A and A' and the duration of the sampling windows are a function of the current frequency of the CLK 190 clock signal, and thus they have changed as a result of the new second frequency of CLK 190. The modified observation window has its duration and location in the time domain governed by the newly adjusted clock signal CLK 190. The fine measurement of the frequency of the pilot tone is shown in FIG. 4C. If the maximum energy is in a bin which is different than the center frequency bin FC, then a second adjustment is made by the adjust oscillator frequency module 216 to the phase lock loop 160, to bring the oscillator frequency for the phase lock loop to a frequency that moves the apparent FFT bin with the largest frequency to the center frequency FC. This results in a new, third clock signal CLK 190. Since the frequency span of 16 Hz. for the fine bins in FIGS. 4C and 4D is smaller than the 64 Hz. span for the bins of FIGS. 4A and 4B, the oscillator frequency for the phase locked loop 160 progressively approaches synchronization with the frequency of the received pilot tone. In accordance with the invention, the estimated time delay and frequency offset processor 208 applies a second enable signal to the symbol bit pattern recognition processor 212. A third sample is taken of the pilot tone, using the new, third clock signal CLK 190. The third sample of the pilot tone is used to determine if the pilot data 238 with the symbol pattern 125" will successfully match the reference pattern 234. If there is a successful match, then both the phase and the frequency of the oscillator in the phase locked loop 160 are in synchronization with the incoming pilot tone. This is a synchronization lock indication.

If there is no match, then the error signal 230 is applied to the processor 208. The processor 208 then outputs adjustment signals on the sampling window adjust line 137 and the observation window adjust line 145 to alter the configuration of the observation windows A and A' and the sampling windows to become windows B and B' shown in FIG. 5B. Windows B and B' are suitable for measuring the time offset or phase error between the clock signal 190 and the received pilot tone. The lower frequency pilot tone is sampled using the new, third clock signal CLK 190 as is shown in FIG. 5B, digitized, and applied to the fast Fourier processor 210. The resulting transformed frequency domain characterization of the pilot tone is then applied to the estimated them delay and frequency offset processor 208 which determines the phase or timing error between a clock signal CLK 190 and the pilot tone. For example, the FFT transformed data can be input to processor 208 on line 245, where an inverse FFT is carried out followed by a zero crossing detection in the time domain. Other techniques suggested by the McDonough, et al reference cited above, can be used by the processor 208 to estimate the time delay of the CLK 190 signal with respect to the pilot tone. Then an adjust time offset is applied by the module 214 to the clock circuit 170 to displace in time the clock signal CLK 190 so as to bring it in to time synchronization with the pilot tone. Clock pulses can be added or removed from the CLK 190 signal, for example.

This results in a fourth clock signal CLK 190. A fourth sample is then taken of the pilot tone. The synchronization of the time or phase and frequency of the clock signal CLK 190 with the pilot tone is confirmed by performing a third matching operation in the processor 212 between the symbol pattern 125" and the reference pattern 234. If there is a good match, then the processor 212 enables the remote station to process traffic data 236, since the spread signal received from the base station Z are now synchronized with the clock signal CLK 190 in the remote station X. This is a synchronization lock indication. However, if there is not a good match, the processor 208 repeats the time offset adjustment with module 214 and continues the process of matching with the reference pattern in processor 212 until a steady state synchronization is achieved.

Figure 6:
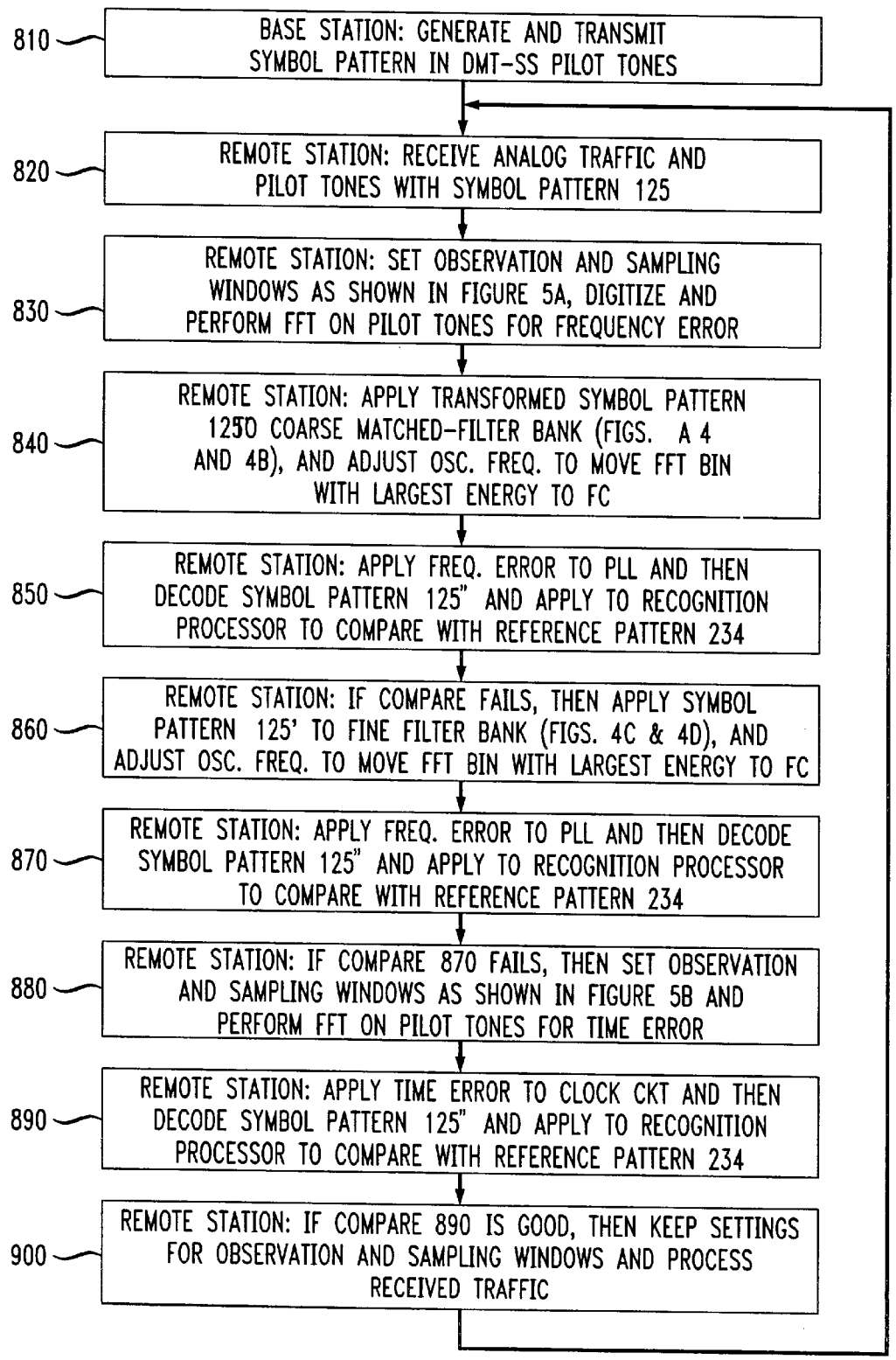
FIG. 6 is a flow diagram of a sequence of operational steps carried out by the base station and the remote station, in accordance with the invention.

FIG. 6 is a flow diagram 800 of the sequence of operational steps carried out by the base station and the remote station in accordance with the invention. The flow diagram 800 of FIG. 6 carries out the steps as follows:

Step 810: Base Station: Generate and transmit symbol pattern in pilot tones.

Step 820: Remote Station: Receive analog traffic and Pilot tones with symbol pattern 125.

Step 830: Remote Station: Set observation and sampling windows as shown in FIG. 5A. Digitize and perform FFT on pilot tones for frequency error.

Step 840: Remote Station: Apply transformed symbol pattern 125' to coarse matched-filter bank (FIGS. 4A and 4B) and adjust oscillator frequency to move FFT bin with the largest energy to center frequency FC.

Step 850: Remote Station: Apply frequency error to PLL and then decode symbol pattern 125" and apply to recognition processor to compare with reference pattern 234.

Step 860: Remote Station: If compare fails, then apply symbol pattern 125' to fine filter bank (FIGS. 4C and 4D) and adjust oscillator frequency to move FFT bin with largest energy to center frequency FC.

Step 870: Remote Station: Apply frequency error to PLL and then decode symbol pattern 125" and apply to recognition processor to compare with reference pattern 234.

Step 880: Remote Station: If compare 870 fails, then set observation and sampling windows as shown in FIG. 5B and perform FFT on pilot tones for time error.

Step 890: Remote Station: Apply time error to clock CLK and then decode symbol pattern 125" and apply to recognition processor to compare with reference pattern 234.

Step 900: Remote Station: If compare 890 is good, then keep settings for observation and sampling windows and process received traffic. Loop back to step 820 to continue monitoring and adjusting the synchronization.

Still another alternate embodiment applies the above described invention in the PWAN Frequency Division Duplex Communications System described in the Alamouti, Michaelson et al. patent application cited above.

Although the preferred embodiments of the invention have been described in detail above, it will be apparent to those of ordinary skill in the art that obvious modifications may be made to the invention without departing from its spirit or essence. Consequently, the preceding description should be taken as illustrative and not restrictive, and the scope of the invention should be determined in view of the following claims.

What is claimed is:

1. A method of synchronizing a remote station to a base station in a bandwidth efficient communication system, comprising the steps of:

generating a clock signal at the base station;

deriving a synchronization symbol pattern from said base station clock signal;

spreading said synchronization symbol pattern at the base station with spreading codes that distributes the synchronization symbol pattern over a plurality of discrete tones, forming a spread signal;

transmitting the spread signal from the base station;

receiving the spread signal at the remote station;

generating a first clock signal at the remote station;

sampling said discrete tones at the remote station using said remote station first clock signal, forming a first sampled signal;

applying said first sampled signal to a matched filter, forming frequency error signal;

using said frequency error signal, forming a second clock signal;

sampling said discrete tones at the remote station using said remote station second clock signal, forming a second sampled signal;

selectively adjusting a time offset value of said remote station second clock signal forming a third clock signal;

sampling said discrete tones at the remote station using said remote station third clock signal, forming a third sampled signal;

despreading said third sampled signal at the remote station with despreading codes to form an extraction of said synchronization symbol pattern;

comparing said extraction of said synchronization symbol pattern with a reference symbol pattern at the remote station; and selectively processing traffic signals received from the base station using said third clock signal, if said step of comparing said extraction is successful.

2. A method of synchronizing a remote station to a base station in a bandwidth efficient communication system, comprising the steps of:

generating a clock signal at the base station;

deriving a synchronization symbol pattern from said base station clock signal;

spreading said synchronization symbol pattern at the base station with spreading codes that distributes the synchronization symbol pattern over a plurality of discrete tones, forming a spread signal;

transmitting the spread signal from the base station;

receiving the spread signal at the remote station;

generating a first clock signal at the remote station;

sampling said discrete tones at the remote station using said remote station first clock signal, forming a first sampled signal;

applying said first sampled signal to a matched filter, forming frequency error signal;

using said frequency error signal, forming a second clock signal; sampling said discrete tones at the remote station using said remote station second clock signal, forming a second sampled signal;

selectively adjusting said frequency of said remote station second clock signal, forming a third clock signal, if said comparing step is not successful;

sampling said discrete tones at the remote station using said remote station third clock signal, forming a third sampled signal;

despreading said third sampled signal at the remote station with despreading codes to form an extraction of said synchronization symbol pattern;

comparing said extraction of said synchronization symbol pattern with a reference symbol pattern at the remote station; and selectively processing traffic signals received from the base station using said third clock signal, if said step of comparing said extraction is successful.

3. The method of synchronizing a remote station to a base station in a bandwidth efficient communication system of claim 2, further comprising the steps of:

selectively adjusting a time offset value of said remote station third clock signal forming a fourth clock signal, if said step of comparing said extraction is not successful;

sampling said discrete tones at the remote station using said remote station fourth clock signal, forming a fourth sampled signal;

despreading said fourth sampled signal at the remote station with despreading codes to form a next extraction of said synchronization symbol pattern;

comparing said next extraction of said synchronization symbol pattern with said reference symbol pattern at the remote station; and selectively processing traffic signals received from the base station using said fourth clock signal, if said step of comparing said next extraction is successful.

4. A method of synchronizing a remote station to a base station in a bandwidth efficient communication system, comprising the steps of:

generating a clock signal at the base station;

deriving a synchronization symbol pattern from said base station clock signal;

spreading said synchronization symbol pattern at the base station with spreading codes that distributes the synchronization symbol pattern over a plurality of discrete tones, forming a spread signal;

transmitting the spread signal from the base station;

receiving the spread signal at the remote station;

generating a first clock signal at the remote station;

sampling said discrete tones at the remote station using said remote station first clock signal, forming a first sampled signal;

applying said first sampled signal to a matched filter, forming frequency error signal;

using said frequency error signal, forming a second clock signal;

sampling said discrete tones at the remote station using said remote station second clock signal, forming a second sampled signal;

selectively sampling said discrete tones at the remote station using said remote station second clock signal, forming a second sampled signal, if said comparing step is not successful;

applying said second sampled signal to a matched filter bank, forming a second frequency error signal;

adjusting a frequency of said remote station second clock signal using said second frequency error signal, forming a third clock signal;

sampling said discrete tones at the remote station using said remote station third clock signal, forming a third sampled signal;

despreading said third sampled signal at the remote station with despreading codes forming an extraction of said synchronization symbol pattern;

comparing said extraction of said synchronization symbol pattern with a reference symbol pattern at the remote station; and selectively processing traffic signals received from the base station using said third clock signal, if said step of comparing said extraction is successful.

5. The method of synchronizing a remote station to a base station in a bandwidth efficient communication system of claim 4, further comprising the steps of:

selectively adjusting a time offset value of said remote station third clock signal forming a fourth clock signal, if said step of comparing said extraction is not successful;

sampling said discrete tones at the remote station using said remote station fourth clock signal, forming a fourth sampled signal;

despreading said fourth sampled signal at the remote station with despreading codes to form a next extraction of said synchronization symbol pattern;

comparing said next extraction of said synchronization symbol pattern with said reference symbol pattern at the remote station; and selectively processing traffic signals received from the base station using said fourth clock signal, if said step of comparing said next extraction is successful.

6. The method of synchronizing a remote station to a base station in a bandwidth efficient communication system of claim 5, wherein said base station and said remote station are part of a wireless discrete tone communications system.

7. A method of synchronizing a remote station to a base station in a wireless discrete tone communications system, comprising the steps of:

generating a clock signal at the base station;

deriving a synchronization symbol pattern from said base station clock signal;

spreading said synchronization symbol pattern at the base station with spreading codes that distributes the synchronization symbol pattern over a plurality of discrete tones, forming a spread signal;

transmitting the spread signal from the base station and receiving the spread signal at the remote station;

generating a first clock signal at the remote station;

sampling said discrete tones at the remote station using said remote station first clock signal, forming a first sampled signal;

forming a frequency error signal from said first sampled signal;

adjusting a frequency of said remote station first clock signal using said frequency error signal, forming a second clock signal;

sampling said discrete tones at the remote station using said remote station second clock signal, forming a second sampled signal;

despreading said second sampled signal at the remote station with despreading codes to extract said synchronization symbol pattern;

comparing said extracted synchronization symbol pattern with a reference symbol pattern at the remote station; and selectively processing traffic signals received from the base station using said second clock signal, if said comparing step is successful.

8. The method of synchronizing a remote station to a base station in a wireless discrete tone communications system of claim 7, further comprising the steps of:

selectively adjusting a time offset value of said remote station second clock signal forming a third clock signal, if said comparing step is not successful;

sampling said discrete tones at the remote station using said remote station third clock signal, forming a third sampled signal;

despreading said third sampled signal at the remote station with despreading codes to form a second extraction of said synchronization symbol pattern;

comparing said second extraction of said synchronization symbol pattern with said reference symbol pattern at the remote station; and selectively processing traffic signals received from the base station using said third clock signal, if said step of comparing said second extraction is successful.

9. The method of synchronizing a remote station to a base station in a wireless discrete tone communications system of claim 7, further comprising the steps of:

selectively sampling said discrete tones at the remote station using said remote station second clock signal, forming a second sampled signal, if said comparing step is not successful;

forming a second frequency error signal from said second sampled;

adjusting a frequency of said remote station second clock signal using said second frequency error signal, forming a third clock signal;

sampling said discrete tones at the remote station using said remote station third clock signal, forming a third sampled signal;

despreading said third sampled signal at the remote station with despreading codes forming a second extraction of said synchronization symbol pattern;

comparing said second extraction of said synchronization symbol pattern with said reference symbol pattern at the remote station; and selectively processing traffic signals received from the base station using said third clock signal, if said step of comparing said second extraction is successful.

10. The method of synchronizing a remote station to a base station in a bandwidth efficient communication system of claim 9, further comprising the steps of:

selectively adjusting a time offset value of said remote station third clock signal forming a fourth clock signal, if said step of comparing said second extraction is not successful;

sampling said discrete tones at the remote station using said remote station fourth clock signal, forming a fourth sampled signal;

despreading said fourth sampled signal at the remote station with despreading codes to form a third extraction of said synchronization symbol pattern;

comparing said third extraction of said synchronization symbol pattern with said reference symbol pattern at the remote station; and selectively processing traffic signals received from the base station using said fourth clock signal, if said step of comparing said third extraction is successful.

11. A method of synchronizing a remote station to a base station in a wireless discrete tone communications system to enable communication of data traffic, comprising the steps of:

generating a clock signal at the base station;

deriving a synchronization symbol pattern from said base station clock signal;